Patented Dec. 12, 1950

2,533,899

UNITED STATES PATENT OFFICE 2,533,899

METHOD OF PRODUCING VESICULAR MOLDED PRODUCTS FROM BURNT CLAYS, SHALES, OR SIMILAR ARGILLACEOUS MATERIAL

Arthur Ryner, London, England, assignor to American Aggregate Company, Kansas City, Mo., a corporation of Missouri No Drawing. Application March 25, 1946, Serial No. 657,058. In Great Britain January 26, 1945

6 Claims. (Cl. 25—156)

This invention relates to the production of vesicular moulded products from burnt clays, shales or similar argillaceous materials.

It has been known for many years that when such materials are heated to a temperature at which the mass becomes soft and plastic, i. e. is in a state of incipient fusion, and are held at this temperature for a short period of time to cause certain of the constituents of the mass to generate gases, an expansion takes place due to the gentle evolution of the gases practically uniformly throughout the mass. If the latter then be cooled it retains a vesicular character, i. e. it contains a large number of unconnected small cells, rendering it light in apparent weight. Nevertheless it has considerable mechanical strength and it has been widely used as a lightweight aggregate for use in the production of concrete.

The processes just above described are well set forth in Patent No. 1,707,395, dated April 2, 1929, and Reissue Patent No. 16,750, dated September 27, 1929 (original No. 1,255,878, dated February 12, 1918).

It has also been proposed to produce vesicular moulded articles from such materials, without the addition of cementitious materials, by grinding or otherwise reducing the clay, shale or the like to a substantially uniform condition, then mixing it with water to form a mud which is shaped as required and finally heating the shaped articles, unsupported by moulds, in a furnace or kiln in order to expel the moisture and then produce vesiculation. The articles produced, as will be understood, lost the sharpness of definition of their shapes in this heating stage owing to their being in an unsupported condition during the dehydration and expansion steps.

The object of the present invention is to provide an improved process for the production of vesicular moulded products from burnt argillaceous materials which is such that the products will accurately reproduce the shapes of the moulds and will be capable of many and varied uses.

According to the invention, the improved process is characterised by the step of effecting at least the final heating stage or a substantial proportion thereof while the material is confined in the mould.

If desired, the whole heating process may be carried out while the material is in a mould or the materal may first be heated to just below the temperature at which vesiculation and expansion would occur and then be filled into a mould for the final stage of heating to the expanded condition. Alternatively, the material may be heated to the temperature which causes it to assume the expanded condition and then be filled into a mould in which it is compacted while still being maintained at the said required temperature.

When the material is heated throughout in the mould, a predetermined volume of the raw material is filled into the latter such that, upon vesiculation occurring, the mass will expand to fill the mould and take the shape thereof.

In the other cases, where the raw material is first heated outside the mould, it is preferred to grade the hot material to a uniform size before it is filled into the mould and, with advantage, the graded material may be subjected to a rolling, pressing or extruding operation on its way to the mould in order to compact the particles and produce uniformity of texture. In all cases it is most advantageous to vibrate the mould during the filling thereof and, when required, during the final heating stage.

So that a superficial skin may be produced on the moulded article, as is sometimes desired, the final heating stage may be effected in an oxidising atmosphere.

It will be understood that for most purposes the raw material is ground or otherwise comminuted to a uniform particle size before the heating stage and that the ground material may be mixed with water to form a paste or slurry before its introduction into a furnace or kiln for the burning operation.

Fluxes, such as finely powdered oxide of iron, may in some cases be added to the hot material prior to the vesiculation stage.

For some purposes it is preferred to mix a fibrous fire-proof material with the hot argillaceous material prior to the final heating and vesiculation thereof in order to improve the cohesion of the particles in the finished product. A suitable material is asbestos in its fibrous form.

Again, the strength of the finished products may be increased to some extent if a siliceous material, such as sand or glass, be admixed with the argillaceous material at some stage before vesiculation is effected. The glass may be in the form of powder or of fibres.

A very suitable raw material, which expands to a much greater degree than most argillaceous materials at the vesiculation stage, is the shale obtained from the layers above coal seams and which is usually available in large quantities at colliery pit-heads.

Obviously, the moulds must be of a suitable heat-resisting material, usually of a refractory character, and the necessary steps must ordinarily be taken to prevent sticking of the moulded articles to the mould walls. The coating of the latter with graphite has been found suitable.

Alternatively, however, such sticking of the vesicular mass to one or more of the mould walls may be desirable, as when the said wall or walls is or are to constitute the outer skin of part or all of the moulded product. For example, the mould walls may consist of a clay material which does not expand or become vesicular at the temperatures concerned, these walls being given adequate rigidity and strength to serve as moulding surfaces, as by first baking or burning them. Thus the mould may be built up from preformed slabs of burnt brick-clay which ultimately form the outer surface layers of the moulded product.

It is to be understood that the processes just described follow substantially the same heat requirements as set down in the above mentioned prior patents. In other words, as specifically set forth in Reissue Patent No. 16,750, the temperature at which the mass becomes soft and plastic is in excess of 1500 degrees F. and a state of incipient fusion and expansion occurs between 1700 and 2200 degrees Fahrenheit.

The invention may be employed to produce building units, for example, by making one side of the mould from a preformed slab which is of predetermined texture or colour, or which will assume such texture or colour when subjected to the vesiculation temperature of the material to be moulded, the finished building unit being faced with this slab.

What I claim is:

1. The process of making molded articles from raw argilaceous material which consists in heating the material to a temperature below the temperature at which vesiculation and expansion of said material occurs; placing the heated material in a mold; and thereafter heating the material to an expanded condition, said mold being made from a pre-baked clay material which does not expand at the temperature of said last mentioned heating step whereby to present a composite article including the mold.

2. The process of making molded articles from raw argillaceous material which consists in grading said material into particles of uniform size; mixing said graded particles with water to form a slurry; heating the material to a temperature below the temperature at which vesiculation and expansion of said material occurs; admixing a flux therewith; placing the heated material in a mold; and thereafter heating the material to an expanded condition.

3. The process of making molded articles from raw argillaceous material which consists in grading said material into particles of uniform size; mixing said graded particles with water to form a slurry; heating the material to a temperature below the temperature at which vesiculation and expansion of said material occurs; admixing iron oxide therewith; placing the heated material in a mold; and thereafter heating the material to an expanded condition.

4. The process of making molded articles from raw argillaceous material which consists in grading said material into particles of uniform size; mixing said graded particles with water to form a slurry; heating the material to a temperature below the temperature at which vesiculation and expansion of said material occurs; admixing fibrous fire-proof material therewith; placing the heated material in a mold; and thereafter heating the material to an expanded condition.

5. The process of making molded articles from raw argillaceous material which consists in grading said material into particles of uniform size; mixing said graded particles with water to form a slurry; heating the material to a temperature below the temperature at which vesiculation and expansion of said material occurs; admixing asbestos therewith; placing the heated material in a mold; and thereafter heating the material to an expanded condition.

6. The process of making molded articles from raw argillaceous material which consists in grading said material into particles of uniform size; mixing said graded particles with water to form a slurry; heating the material to a temperature below the temperature at which vesiculation and expansion of said material occurs; admixing silicious material therewith; placing the heated material in a mold; and thereafter heating the material to an expanded condition.

ARTHUR RYNER.

REFERENCES CITED

The following references are of record in the file of this patent:

UNITED STATES PATENTS

| Number | Name | Date |
|---|---|---|
| Re. 18,844 | Slidell | May 30, 1933 |
| 930,801 | Szczakowa et al. | Aug. 10, 1909 |
| 1,255,878 | Hayde | Feb. 12, 1918 |
| 1,528,759 | Fallon | Mar. 10, 1925 |
| 1,583,521 | Boynton | May 4, 1926 |
| 1,707,395 | Hayde | Apr. 2, 1929 |
| 1,840,609 | Slidell | Jan. 12, 1932 |
| 1,851,660 | Brand | Mar. 29, 1932 |
| 1,882,052 | Wyatt | Oct. 11, 1932 |
| 1,960,571 | Butterworth | May 29, 1934 |
| 2,124,759 | Bradbyer | July 26, 1938 |
| 2,116,030 | Lindman | May 3, 1938 |
| 2,130,498 | Klemschofski | Sept. 20, 1938 |